United States Patent Office 3,409,305
Patented Nov. 5, 1968

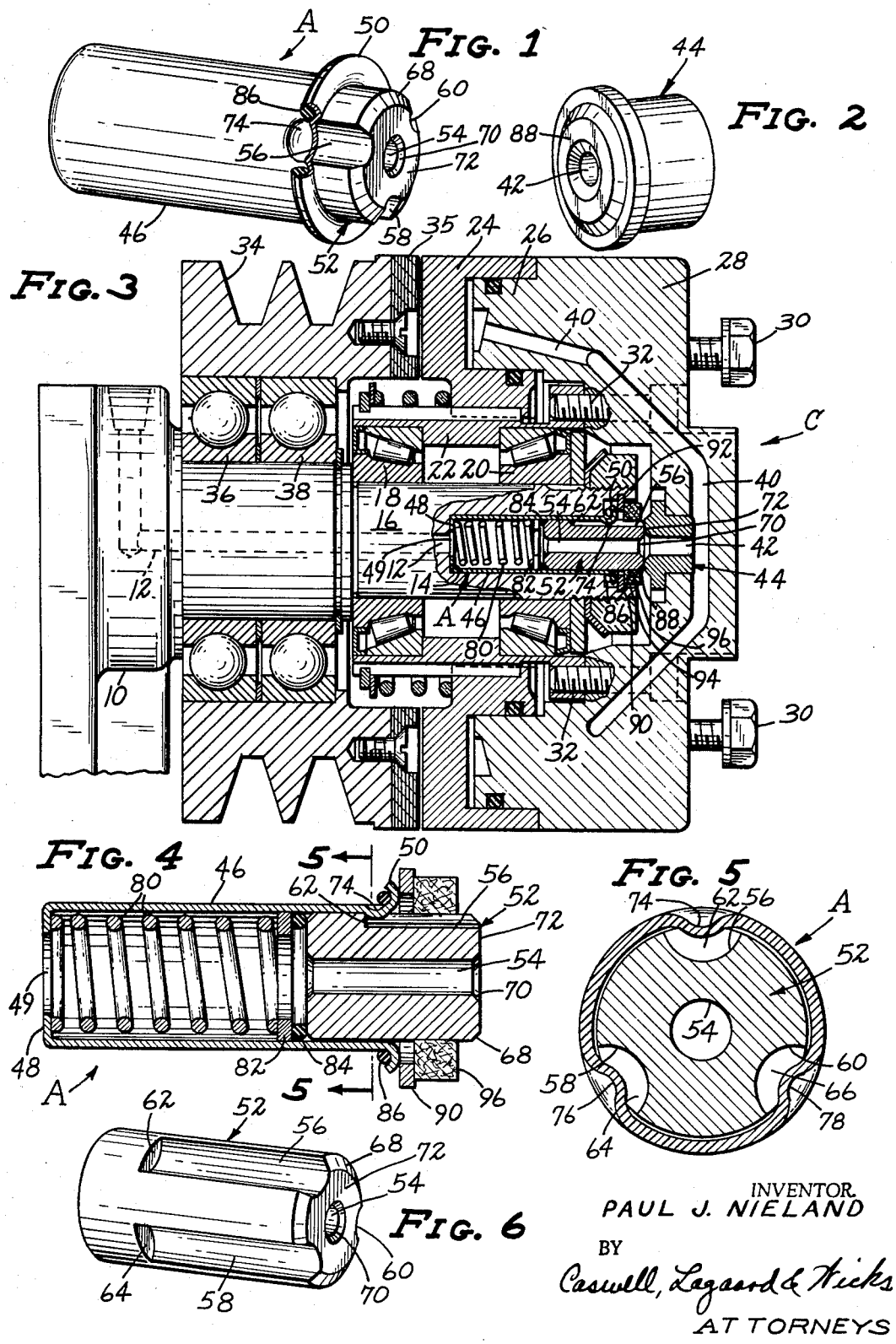

3,409,305
ROTARY AIR SEAL DEVICE
Paul J. Nieland, South St. Paul, Minn., assignor to Horton Manufacturing Co., Inc., Minneapolis, Minn.
Filed Apr. 12, 1966, Ser. No. 546,121
4 Claims. (Cl. 277—40)

ABSTRACT OF THE DISCLOSURE

The disclosure relates to a rotary air seal for passing air between first and second relatively rotating parts axially aligned including one of the members as a shaft having an accessible end and a bore extending through the end together with a tubular cartridge having a single lateral wall with an open outer end and an inner end portion. A sealing member is provided having a cylindrical body and mounted in the tubular cartridge, the sealing member having an air passageway on the longitudinal axis thereof together with means within the cartridge for urging the sealing member from the cartridge together with shoulder means carried by the cartridge and the sealing member for limiting the extent that the sealing member is urged from the tubular cartridge and shoulder means for preventing rotation of the sealing member in the cartridge.

---

The invention relates broadly to an improvement in air seals and more particularly to a rotary air seal, connection between first and second relatively rotating members.

In conventional present-day rotary air seals, assembly of the parts is difficult as is the replacement of parts thereof. It is an object of the invention to provide an air seal device for creating an air seal between two relatively rotating parts, the device being in the form of a self-contained unit which is very simply installed or removed and replaced.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a perspective view of the rotary air seal device.

FIGURE 2 is a perspective view of the companion rotor seal piece.

FIGURE 3 is a sectional view through an air operated clutch, portions of which are broken away with the rotary air seal device shown in operational use therewith.

FIGURE 4 is a longitudinal sectional view through the rotary air seal device.

FIGURE 5 is a sectional view on the line 5—5 of FIGURE 4.

FIGURE 6 is a perspective view of the floating seal plug removed from the device.

Referring to the drawings in detail, FIGURE 3 is a section through a clutch C showing one use of the rotary seal device A. The clutch C of FIGURE 3 briefly includes the stationary base portion 10 and formed therein is the air passageway 12 which leads to the cavity 14 formed in the hub portion 16 thereof. The hub portion 16 is stationary and mounts the bearings 18 and 20 which mount the hub 22 rotatable thereon. Slidable axially on the hub 22 is the annular cylinder 24, and positioned within the annular cylinder is the annular piston 26. The piston 26 is formed with the base portion 28 on which may be mounted a fan, for example, by means of the bolts 30. The cylinder 24 together with piston 26 and base 28 are rotatable with the hub 22 by means of the bearings 18 and 20. The base 28 is connected to the hub 22 by means of the bolts 32.

The sheave 34 is provided with the friction facing 35 and is rotatably mounted on the base 10 by means of the bearings 36 and 38 and driven by belts from an outside source of power. Formed in the piston base portion 28 is the air passageway 40 connecting the cylinder 24 to the axial passageway 42 of the seal rotor 44 mounted in the base 28. The air passageway 40 and air passageway 42 of the seal rotor 44 are brought into communication with air passageway 12 by means of the rotary seal device A described hereinafter.

It will be seen that with air pressure transferred from air passageway 12 to air passageway 40 by means of the device A, and directed to the cylinder 24, the cylinder 24 is brought into contact with friction facing 35, and as a result, the piston base 28 is rotated with the driven sheave 34. Thus when the piston base 28 is rotated there is relative motion between the base 28 and the stationary hub 16 which is part of the base portion 10.

The air seal device A includes the cylindrical casing 46 which is formed with inturned annular shoulder 48 at the inner end thereof which forms the axial opening 49 and the out turned annular flange 50 at the outer end thereof. Further provided is the cylindrical seal member 52 which is formed with axial passageway 54. The cylindrical seal member 52 is formed of a carbon and graphite mixture and has formed on the outer surface thereof the longitudinally extending spaced recesses or fluting 56, 58 and 60. The recesses 56, 58 and 60 each stop short of the inner end of the seal member 52 and thereby form the shoulders 62, 64 and 66, respectively. The outer end of the seal member 52 is chamfered slightly as at 68 and at 70 at the hole 54 thereby leaving the annular sealing face surface 72 which is normal to the longitudinal axis of the cylindrical seal member 52.

The outside diameter of the seal member 52 is slightly less than the inside diameter of the casing 46 whereby the member 52 is slidable within the same. The seal member 52 is slidably mounted in the casing for limited movement therein by means of the stop shoulders or dimples 74, 76 and 78 formed in the casing adjacent the flange 50 and extending into the recesses 56, 58 and 60, respectively. The seal member 52 is urged to the outer end of the casing 46 with the dimples 74, 76 and 78 in engagement with the shoulders 56, 58 and 60, respectively, to the position of FIGURES 1, 2 and 4 by means of the coil spring 80 positioned against the shoulder 48 and the washer 82 adjacent the O-ring 84 which abuts the inner end of the seal member 52. The seal member 52 is held at a fully extended position and is prohibited from extension from the casing 46 by means of the dimples 74, 76 and 78 engaging the shoulders 56, 58 and 60 of the seal member as particularly shown in FIGURE 4. The engagement of the dimples 74, 76 and 78 in the recesses 56, 58, and 60, respectively, prohibit the sealing member from rotation. The O-ring 84 prevents air from passing from within the casing 46 around the seal member 52 to a point outwardly thereof. Mounted on the outside of the casing 46 and adjacent to the flange 50 is the O-ring 86 which prohibits air from passing between the casing 46 and the cavity 14.

The casing 46 of the seal device A is so positioned in the hub 16 that the sealing face surface 72 of the seal member 52 is in pressing sealing engagement with the sealing face surface 88 of the seal rotor 44 mounted in the piston base 28. The sealing face surface 88 of the seal rotor 44 is a hard steel and with the same in contact with the face surface 72 of the carbon graphite seal member an air tight seal is effected which remains air tight when the seal rotor 44 is rotated as a result of the piston base 28 being rotated. Thus air pressure may be directed from passageway 12 to passageway 40 via the seal made between the seal member 52 and the rotor seal 44.

It will be seen that in this assembly of the clutch C that the mounting of the seal member 52 is easily and quickly done by simply positioning the seal device A in the cavity 14. There is no need for holding springs in compressed states, no need of slipping O-rings into place and finally securing all of the same together by pressure of the rotor seal 44 in its proper place.

Further provided is the bowed tru-arc ring 90 which is mounted in an annular recess 92 formed in the hub 16 and in engagement with the annular flange 50 of the casing 46 with the O-ring 86 in the sealing engagement with the side wall of the annular recess 94. The ring 90 urges the O-ring 86 in pressure engagement with the radial wall of the recess 94. Also provided is the felt washer 96 mounted on the end of the sealing member 52 for lubrication of the member 52.

The invention is not to be understood as restricted to the details set forth since these may be modified within the scope of the appended claims without departing from the spirit and scope of the invention.

Having thus described the invention, what is claimed as new and desired to be secured by Letters Patent is:

1. A rotary air seal device for passing air between first and second relatively rotating axially aligned members comprising:
   (a) one of said members being a shaft having an accessible end and
   (b) an axial bore therein extending through said accessible end,
   (c) a tubular cartridge having a single lateral wall and an inner end portion,
   (d) said cartridge having an open outer end and slidably mounted in said bore,
   (e) a sealing member having a cylindrical body and slidably mounted in said tubular cartridge,
   (f) said sealing member having an air passageway formed on the longitudinal axis thereof,
   (g) said sealing member having a sealing face surface formed on the outer end thereof,
   (h) means within said cartridge for urging said sealing member from said tubular cartridge with the sealing face thereof in pressure sealing contact with a sealing face of the other member,
   (i) means carried by the cartridge and the sealing member for limiting the extent that said sealing member is urged from said tubular cartridge, and
   (j) means for preventing rotation of said sealing member within said cartridge.

2. The device of claim 1 in which the inner end portion of said tubular cartridge is formed with a hole axially thereof in alignment with said axial air passageway of said sealing member, the diameter of said hole being less than the inside diameter of the cartridge.

3. The device of claim 2 in which
   (a) said limiting means includes shoulder means formed on said sealing member adapted to engage
   (b) stop shoulder means formed on said tubular cartridge.

4. The device of claim 3 in which said means for preventing rotation of said sealing member includes said sealing member having at least one flute formed on the surface thereof and in which is positioned said stop shoulder means of said tubular cartridge.

References Cited
UNITED STATES PATENTS

| | | | |
|---|---|---|---|
| 2,469,588 | 5/1944 | Aschauer | 277—74 X |
| 2,843,404 | 7/1958 | Janetz | 277—85 |
| 2,857,031 | 10/1958 | Fawick | 277—74 X |
| 3,151,527 | 10/1964 | Hamlin | 91—175 |
| 3,222,077 | 12/1965 | Snabes | 277—40 |

SAMUEL ROTHBERG, *Primary Examiner.*